United States Patent
Yanagi

(10) Patent No.: US 10,791,226 B2
(45) Date of Patent: Sep. 29, 2020

(54) COMMUNICATION DEVICE AND NON-TRANSITORY COMPUTER-READABLE MEDIUM STORING COMPUTER-READABLE INSTRUCTIONS FOR COMMUNICATION DEVICE

(71) Applicant: BROTHER KOGYO KABUSHIKI KAISHA, Nagoya-shi, Aichi (JP)

(72) Inventor: Satoru Yanagi, Obu (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/666,473

(22) Filed: Oct. 29, 2019

(65) Prior Publication Data
US 2020/0137235 A1    Apr. 30, 2020

(30) Foreign Application Priority Data
Oct. 31, 2018  (JP) ................................. 2018-205257

(51) Int. Cl.
H04N 1/00 (2006.01)
H04L 12/24 (2006.01)
H04N 1/44 (2006.01)

(52) U.S. Cl.
CPC ....... *H04N 1/00079* (2013.01); *H04L 41/064* (2013.01); *H04L 41/069* (2013.01); *H04N 1/00034* (2013.01); *H04N 1/4426* (2013.01)

(58) Field of Classification Search
None
See application file for complete search history.

(56) References Cited

U.S. PATENT DOCUMENTS

| 2006/0114501 A1 | 6/2006 | Nakamura | |
| 2016/0254981 A1* | 9/2016 | Kimura | H04L 41/0686 709/224 |
| 2017/0163669 A1* | 6/2017 | Brown | G06N 5/04 |

FOREIGN PATENT DOCUMENTS

| JP | 2006-155367 A | 6/2006 |
| JP | 2010-287108 A | 12/2010 |

* cited by examiner

*Primary Examiner* — Lennin R Rodriguezgonzalez
(74) *Attorney, Agent, or Firm* — Scully, Scott, Murphy & Presser, PC

(57) ABSTRACT

A communication device may perform to; in a case where a first event occurs in the communication device before a time and date measured by a time and date measuring unit is changed to a current time and date and the first event is a predetermined event, send specific log information to a server; in a case where the first event is an event different from the predetermined event, calculate first time and date information at a first timing that is after the time and date measured by the time and date measuring unit has been changed to the current time and date; and in a case where the first time and date information is calculated, send first log information to the server, the first log information indicating a log of the first event which is the event different from the predetermined event.

12 Claims, 11 Drawing Sheets

FIG. 7

(First Embodiment)

First Cycle (10:05)

Log Table 36 of Printer 10

| Log Number | Time and Date Information | Event Information |
|---|---|---|
| log01 | - | authentication, result = fail, boot = 00:01:00 |
| log02 | - | print, result = success, boot = 00:02:00 |
| log03 | - | print, result = success, boot = 00:03:00 |

Sending of Priority Log Information (T54 of FIG.6)

Log Management Server 100

| Log Information |
|---|
| <20> authentication, result = fail |

First Cycle (10:10)

Calculation of Time and Date Information (T86 of FIG.6)

Log Table 36 of Printer 10

| Log Number | Time and Date Information | Event Information |
|---|---|---|
| log01 | 13-Sep 10:01 | authentication, result = fail |
| log02 | 13-Sep 10:02 | print, result = success |
| log03 | 13-Sep 10:03 | print, result = success |

Sending of Log Information "log01" to "log03" (T88 of FIG.6)

Log Management Server 100

| Log Information |
|---|
| <20> authentication, result = fail |
| <20> 13-Sep 10:01 authentication, result = fail |
| <10> 13-Sep 10:02 print, result = success |
| <10> 13-Sep 10:03 print, result = success |

(Second Embodiment)

(Second Embodiment)
FIG. 10
First Cycle (10:05)
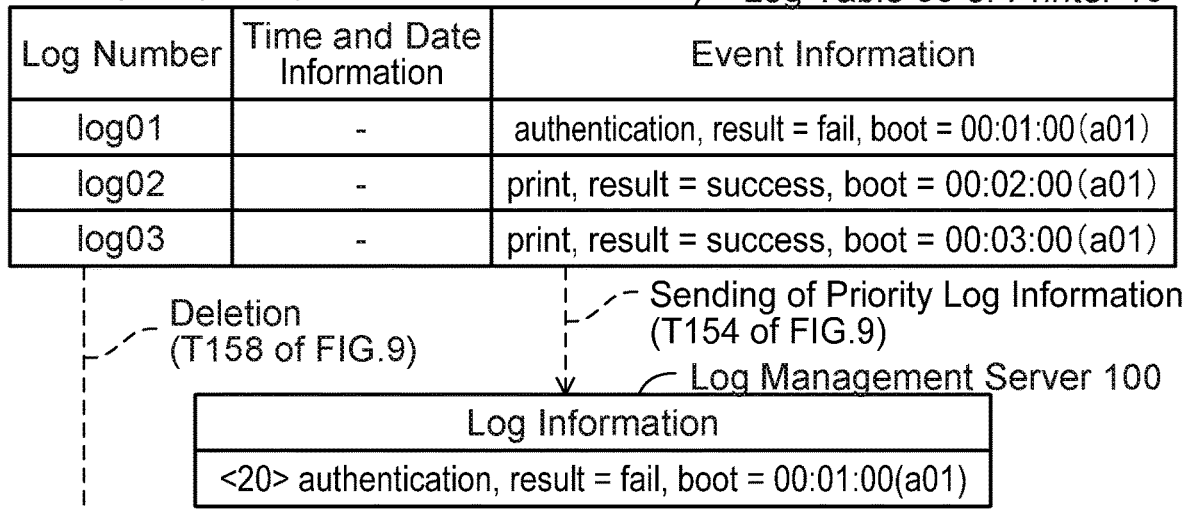
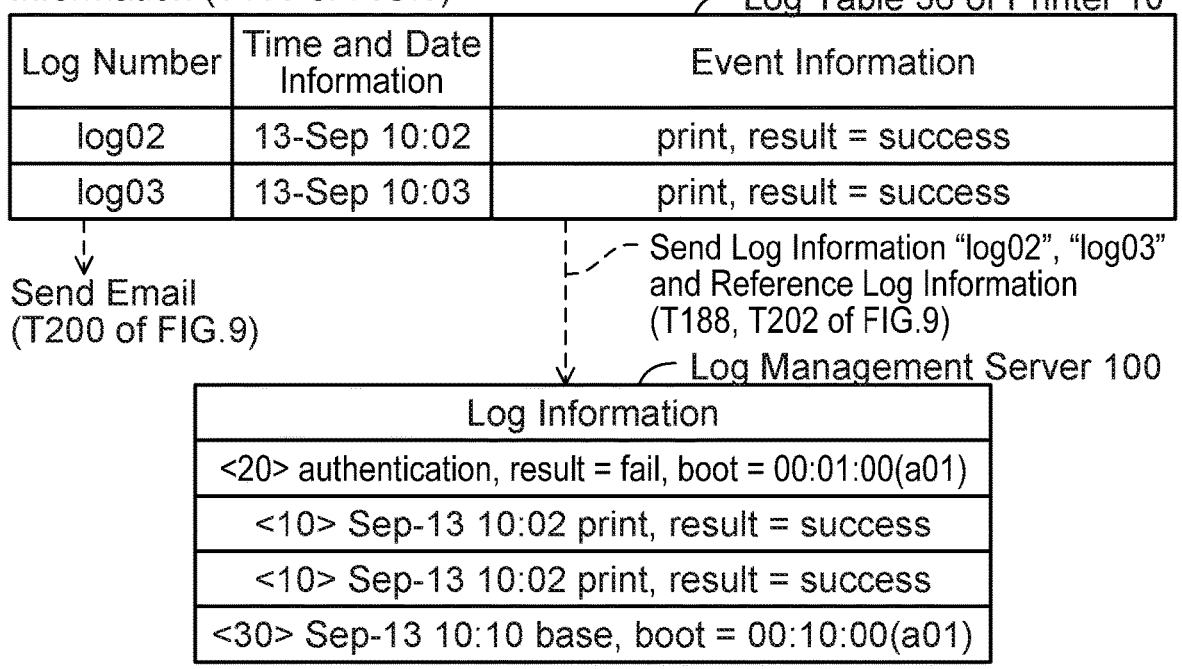

COMMUNICATION DEVICE AND NON-TRANSITORY COMPUTER-READABLE MEDIUM STORING COMPUTER-READABLE INSTRUCTIONS FOR COMMUNICATION DEVICE

CROSS-REFERENCE TO RELATED APPLICATION

This application claims priority to Japanese Patent Application No. 2018-205257 filed on Oct. 31, 2018, the contents of which are hereby incorporated by reference into the present application.

TECHNICAL FIELD

The disclosure herein discloses teachings related to a communication device configured to send log information to a server.

DESCRIPTION OF RELATED ART

An MFP, which is configured to store an operation log including time and date information that indicates a time and date when an operation occurred, is known. The MFP is configured to send the stored operation log to an external host at a predetermined timing according to a Syslog protocol.

SUMMARY

Time and date information included in an operation log normally indicates a time and date measured by a clock in an MFP and the like. The aforementioned art does not consider a situation in which a clock in the MFP is measuring a time and date which differs from a current time and date.

The teachings disclosed herein provides art for sending log information to a server, in consideration of a situation in which a communication device is measuring a time and date which differs from a current time and date.

A communication device disclosed herein may comprise: a time and date measuring unit configured to measure a time and date, wherein in a case where current time and date information indicating a current time and date is obtained, a time and date measured by the time and date measuring unit is changed to the current time and date indicated by the obtained current time and date information; a time period measuring unit configured to measure a lapse of time from when a power of the communication device is turned on; a processor; and a storage storing computer-readable instructions therein, wherein the computer-readable instructions, when executed by the processor, may cause the communication device to: in a first case where a first event occurs in the communication device before the time and date measured by the time and date measuring unit is changed to the current time and date and the first event is a predetermined event, send specific log information to a server, the specific log information indicating a log of the first event which is the predetermined event, wherein in a second case where the first event is an event different from the predetermined event, the specific log information is not sent to the server; in the second case, store first time period information in a memory, the first time period information indicating a lapse of time measured by the time period measuring unit at a timing when the first event occurs; in the second case, calculate first time and date information at a first timing that is after the time and date measured by the time and date measuring unit has been changed to the current time and date, the first time and date information indicating a time and date when the first event, which is the event different from the predetermined event, occurred, and the first time and date information being calculated by using the lapse of time indicated by the first time period information in the memory, a time and date measured at the first timing by the time and date measuring unit, and a lapse of time measured at the first timing by the time period measuring unit; and in a case where the first time and date information is calculated, send first log information to the server, the first log information indicating a log of the first event which is the event different from the predetermined event and including the calculated first time and date information.

A computer program for implementing the communication device and a non-transitory computer-readable medium storing computer-readable instructions for implementing the communication device are also novel and useful. A method implemented by the communication device is also novel and useful.

BRIEF DESCRIPTION OF THE DRAWINGS

FIG. 7 shows information in a printer and a log management server in the case of FIG. 6;
FIG. 10 shows information in the printer and the log management server in the case of FIG. 9.

EMBODIMENTS (Configuration of Communication System 2; FIG. 1)
As shown in FIG. 1, a communication system 2 is provided with a printer 10, a log management server 100, a time server 200, and a terminal device 300. The devices 10, 100, 200, and 300 belong to a same LAN (Local Area Network) 4 and are capable of communicating with each other through the LAN 4.

Figure 1:
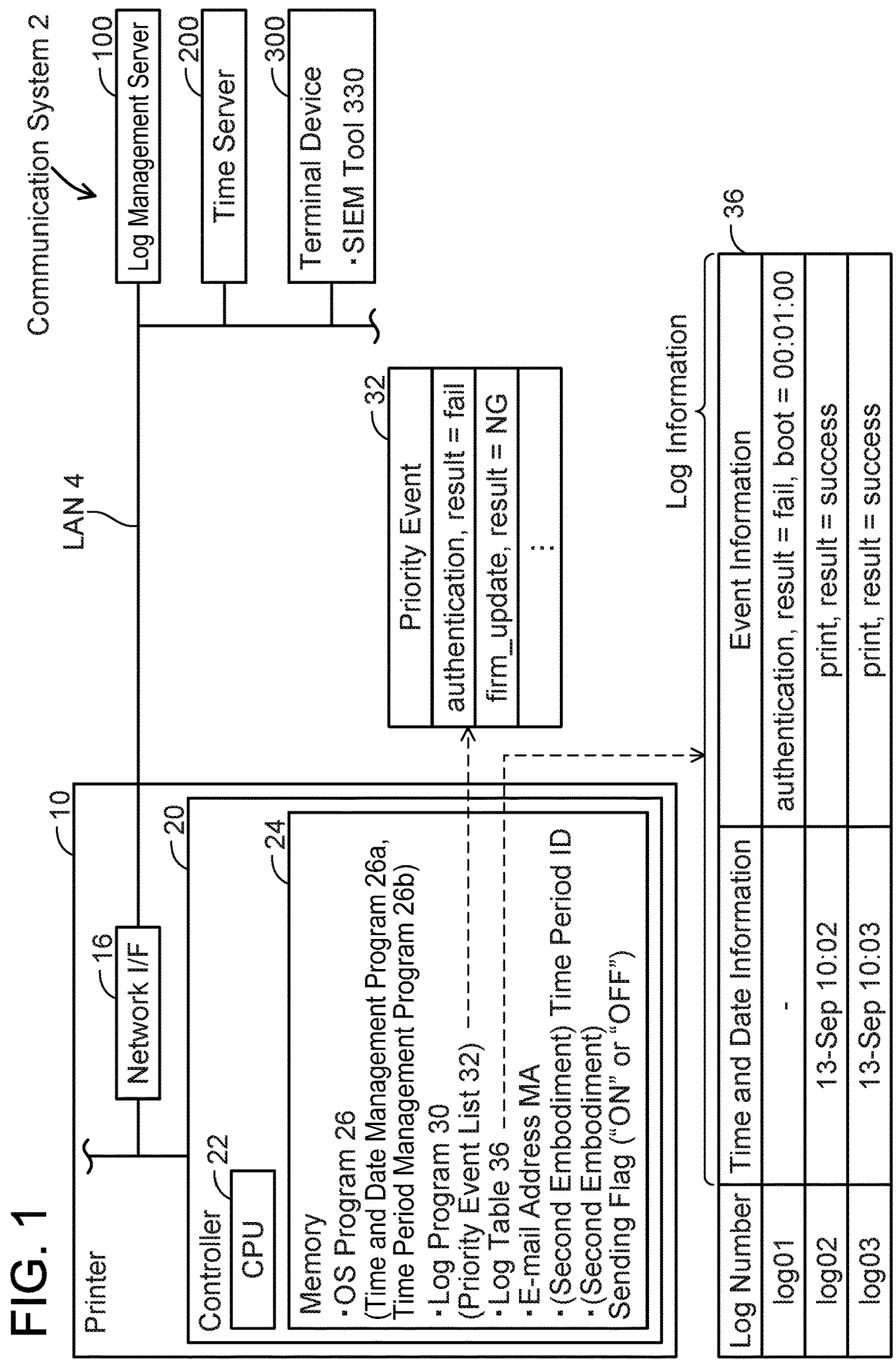
FIG. 1 shows a configuration of a communication system.

(Configuration of Printer 10)
The printer 10 is a peripheral that is configured to be capable of executing a print function (that is, a peripheral of the terminal device 300 and the like). The printer 10 is provided with a network interface 16 and a controller 20. The network interface 16 is an interface configured to execute wired communication and is connected to the LAN 4. Hereinbelow, an interface will be denoted "I/F". In a variant, the network I/F 16 may be an I/F configured to execute wireless communication, and in this case, the LAN 4 may be a so-called wireless LAN.

The controller 20 is provided with a CPU 22 and a memory 24. The CPU 22 is configured to execute various processes according to programs 26, 30 stored in the memory 24. The memory 24 is constituted of a volatile memory, a nonvolatile memory and the like. The memory 24 stores an OS (Operating System) program 26 for realizing basic processes, a log program 30, and an e-mail address MA of an administrator of the printer 10. The OS program 26 is a program provided by an entity other than a vendor of the printer 10. The log program 30 is a program provided by the vendor of the printer 10.

The OS program 26 includes a time and date management program 26a and a time period management program 26b. The time and date management program 26a is configured to measure a time and date and supply, to the log program 30, measured time and date information indicating the measured time and date. Further, in a case of obtaining a current time and date from the time server 200, for example, the time and date management program 26a is configured to change a time and date that it is measuring presently (hereinbelow denoted as "measured time and date") to the current time and date. Before the measured time and date is changed to the current time and date, the time and date management program 26a could measure a time and date that differs from the current time and date, that is, an incorrect time and date.

The time period management program 26b is configured to measure a lapse of time since a power of the printer 10 was turned on and supply, to the log program 30, measured time period information that indicates the measured lapse of time. Further, the lapse of time measured by the time period management program 26b is reset to zero each time the power of the printer 10 is turned on.

The log program 30 is configured to manage log information that indicates a log of event occurred in the printer 10 and send the log information to the log management server 100. The log information is converted to a character string according to a Syslog protocol, and the log information that has been converted to the character string is sent to the log management server 100. The Syslog protocol is a general communication protocol for storing system logs.

The log information includes time and date information that indicates a time and date when the event occurred in the printer 10 and event information that indicates a content of the event. Here, an expression "an event occurs" means that a predetermined process is executed by the printer 10. The predetermined process may include, for example, user authentication, print process, FirmUpdate and the like. The user authentication is a process for authenticating a user of the printer 10. For example, in a case where the printer 10 receives a change request that requests change in setting information (such as a network setting) of the printer 10 from an external device (such as the terminal device 300) capable of communicating with the printer 10, the printer 10 executes the user authentication by using authentication information (such as a user name and a password) included in the change request. The print process is a process of receiving image data from an external device and printing an image represented by the image data. The FirmUpdate is a process of updating a program stored in the printer 10 (such as the OS program, that is, Firmware).

The log program 30 includes a priority event list 32. The priority event list 32 is a list of event contents which should be notified preferentially to the log management server 100, among a plurality of event contents. The event contents that should be notified preferentially may include a failure of the user authentication and execution of abnormal FirmUpdate, for example. An example of the abnormal FirmUpdate may be that the FirmUpdate is executed but predetermined information indicating that the program is normal is not written in the log program 30. The abnormal FirmUpdate could be executed illicitly by a third party which is different from the administrator. Further, as described above, the user authentication is executed when the setting information of the printer 10 is to be changed. Due to this, in a case where the change request is illicitly received from an external device of the third party, the user authentication could fail. As such, the priority event list 32 includes event contents which are highly likely to occur due to illicit conducts of the third party. In other words, the priority event list 32 does not include event contents which are less likely to occur due to illicit conducts of the third party (such as success of the user authentication, normal FirmUpdate, and success or failure of the print process).

The memory 24 further stores a log table 36. The log table 36 is a table for storing log information to be sent to the log management server 100. The log table 36 stores the log information in association with a log number (such as "log01") indicating an identification number of the log information. The log information includes time and date information (such as "Sep-13 10:00") that indicates a time and date when an event occurred and event information (such as "authentication, IP address=10.0.0.99, result=fail") that indicates a content of the event.

(Configuration of Log Management Server 100)

The log management server 100 is configured to manage log information received from the printer 10. The log management server 100 is connected to the LAN 4 by the administrator of the printer 10. In a variant, the log management server 100 may be installed on the Internet.

(Configuration of Time Server 200)

The time server 200 is configured to supply, to the printer 10, current time and date information that indicates the current time and date. The time server 200 is connected to the LAN 4 by the administrator of the printer 10. The time server 200 may, for example, be an NTP (Network Time Protocol) server. In a variant, the time server 200 may be installed on the Internet.

(Configuration of Terminal Device 300)

The terminal device 300 is a device, such as a desktop PC (Personal Computer), a note PC, a tablet PC, and a portable terminal. The terminal device 300 stores an SIEM (Security Information and Event Management) tool 330 for analyzing character strings according to the Syslog protocol. The terminal device 300 is configured to receive log information from the log management server 100 and analyze the received log information according to the SIEM tool 330. By doing so, the terminal device 300 can obtain a time and date when the event occurred in the printer 10 and a content of the event, and can display these information.

Figure 2:
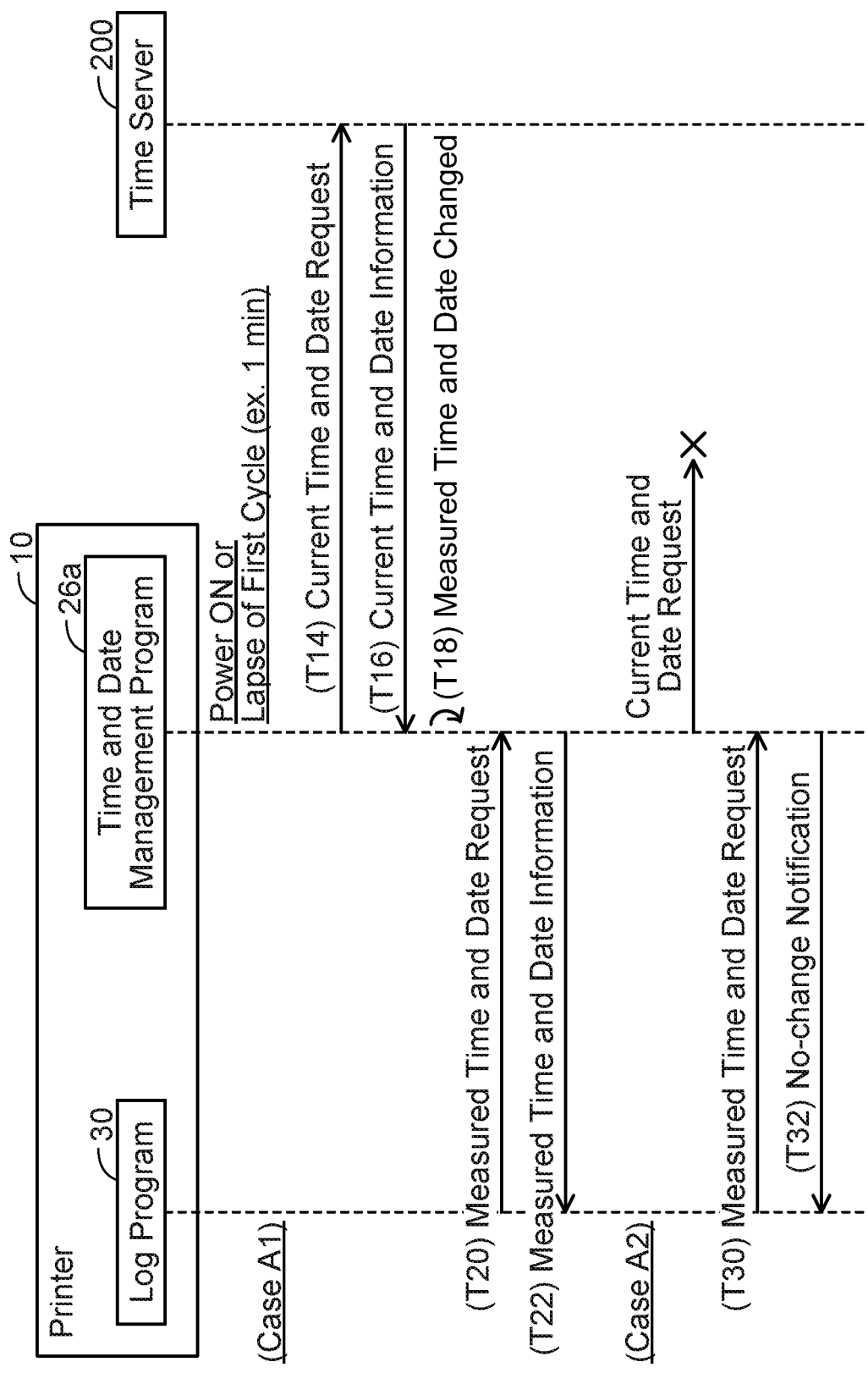
FIG. 2 shows a sequence diagram of a changing process of changing a measured time and date.

(Changing Process: FIG. 2)

A process to change the measured time and date to the current time and date will be described with reference to FIG. 2. Hereinbelow, for the sake of easier understanding, processes which the CPU 22 of the printer 10 executes according to the time and date management program 26a will be described with the time and date management program 26a as the subject of action, instead of describing with the CPU 22 as the subject of action. Similarly, processes which the CPU 22 executes according to the log program 30 will be described with the log program 30 as the subject of action, instead of describing with the CPU 22 as the subject of action.

The time and date management program 26a sends a current time and date request for requesting the current time and date information to the time server 200 through the network I/F 16 in T14, with turn-on of the power of the printer 10 as a trigger.

In Case A1, the time and date management program 26*a* receives the current time and date information from the time server 200 in T16, as a response to the current time and date request.

In T18, the time and date management program 26*a* changes the measured time and date to the current time and date indicated by the received current time and date information.

In Case A1, after the process of T18, the log program 30 supplies, to the time and date management program 26*a*, a measured time and date request for requesting the measured time and date information indicating the measured time and date in T20.

When receiving the measured time and date request from the log program 30 in T20, the time and date management program 26*a* supplies the measured time and date information to the log program 30 in T22. Due to this, the log program 30 can be informed of the measured time and date (that is, the current time and date).

Further, in Case A2, some sort of error, such as an error that the time server 200 is disconnected from the LAN 4, is occurring. Due to this, the time and date management program 26*a* does not receive the current time and date information from the time server 200, despite it having sent the current time and date request to the time server 200 with turn-on of the power of the printer 10 as the trigger. As a result, the measured time and date is not changed to the current time and date.

In Case A2, the time and date management program 26*a* receives the measured time and date request from the log program 30 in T30. However, since the measured time and date has not been changed to the current time and date, the time and date management program 26*a* supplies, to the log program 30, a no-change notification for notifying that the measured time and date has not been changed to the current time and date in T32. Thus, the log program 30 cannot be informed of the measured time and date.

The time and date management program 26*a* repeats supplying the current time and date request to the time server 200 on a first cycle (for example, on 1-minute cycle) until the measured time and date is changed to the current time and date. Then, when the measured time and date has been changed to the current time and date, the time and date management program 26*a* stops sending the current time and date request.

Figure 3:
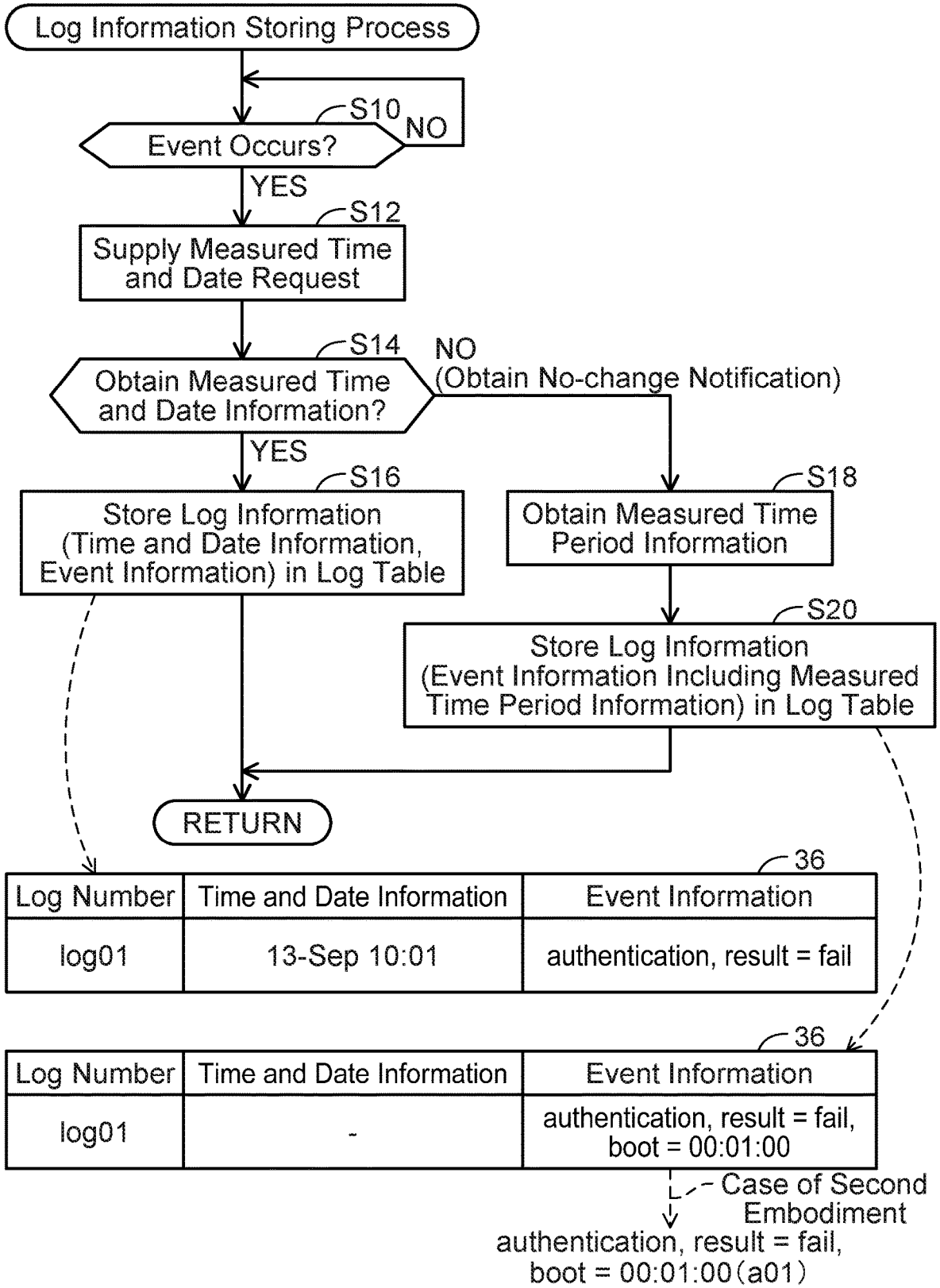
FIG. 3 shows a flowchart of a log information storing process.

(Log Information Storing Process; FIG. 3)

A log information storing process which the CPU 22 of the printer 10 executes according to the log program 30 will be described with reference to FIG. 3. Hereinbelow, for the sake of easier understanding, the log information storing process will be described with the log program 30 as the subject of action, instead of describing the CPU 22 as the subject of action. The same applies to a log information sending process (FIG. 4) and an all log sending process (FIG. 5) to be described later. The process of FIG. 3 is started with turn-on of the power of the printer 10 as a trigger.

In S10, the log program 30 monitors whether an event occurs in the printer 10. When an event occurs (YES in S10), the log program 30 proceeds to S12. Hereinbelow, this event will be termed "target event".

In S12, the log program 30 supplies the measured time and date request to the time and date management program 26*a* (see T20, T30 of FIG. 2).

In S14, the log program 30 determines whether or not measured time and date information has been obtained from the time and date management program 26*a* as a response to the measured time and date request. In a case of determining that measured time and date information has been obtained from the time and date management program 26*a* (YES in S14), the log program 30 proceeds to S16.

In S16, the log program 30 stores log information indicating a log of the target event in the log table 36. Specifically, the log program 30 stores, in the log table 36, log information that includes time and date information (such as a character string "Sep-13 10:01"), which is the obtained measured time and date information, and event information indicating a content of the target event (such as a character string "authentication, result=fail"). When S16 is completed, the log program 30 returns to S10.

In a case of determining that the no-change notification (see T32 of FIG. 2) has been obtained from the time and date management program 26*a* (NO in S14), the log program 30 proceeds to S18.

In S18, the log program 30 supplies a measured time period request to the time period management program 26*b* and obtains measured time period information from the time period management program 26*b*. Due to this, the log program 30 can obtain the measured time period information that indicates a lapse of time measured by the time period management program 26*b* at the timing when the target event occurred.

In S20, the log program 30 stores, in the log table 36, log information that does not include any time and date information but includes event information. Here, this event information further includes the obtained measured time period information (such as a character string "boot=00:01: 00"). When S20 is completed, the log program 30 returns to S10.

Figure 4:
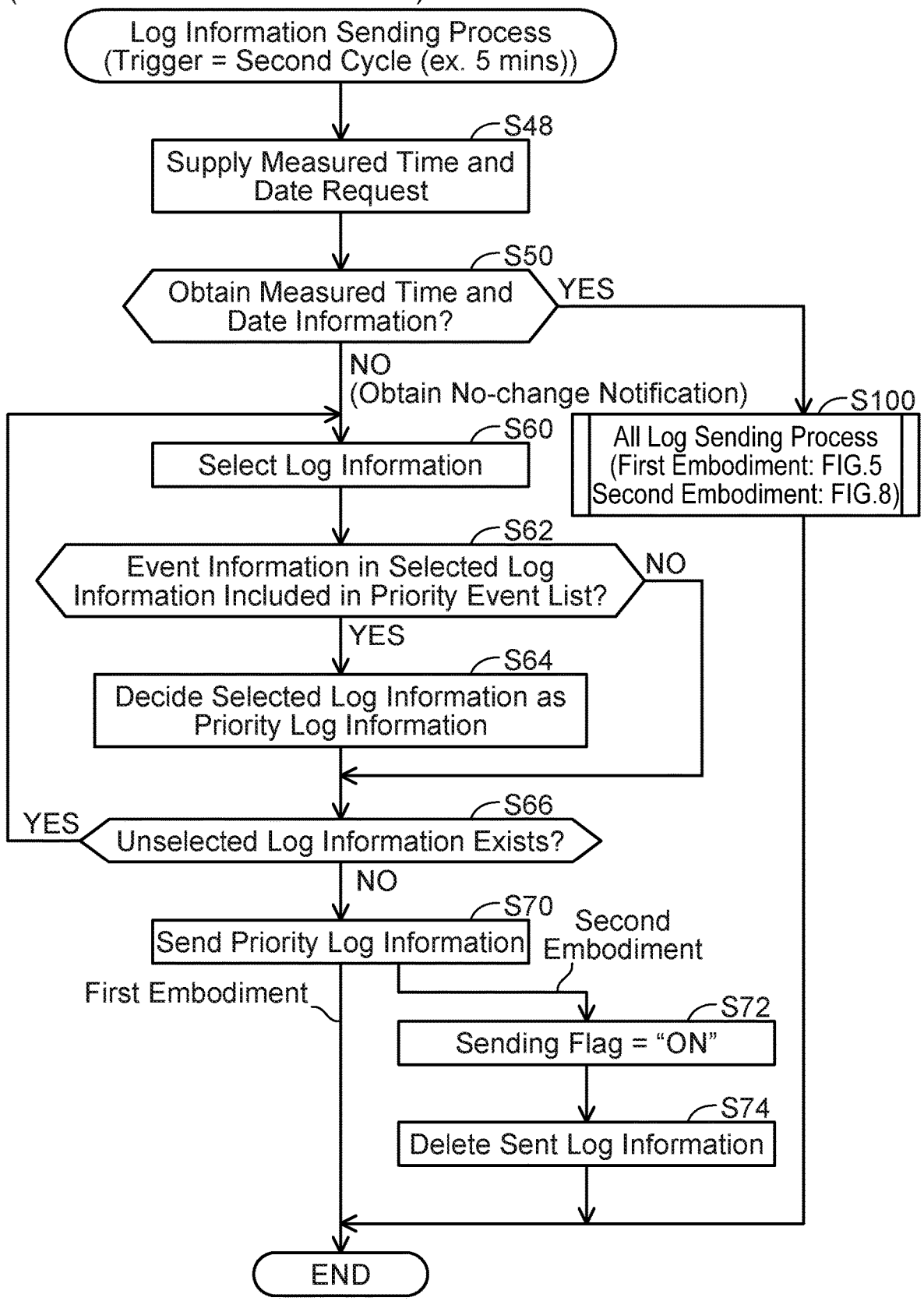
FIG. 4 shows a flowchart of a log information sending process.

(Log Information Sending Process; FIG. 4)

A log information sending process which the CPU 22 of the printer 10 executes according to the log program 30 will be described with reference to FIG. 4. The process of FIG. 4 is executed on a second cycle (for example, on 5-minutes cycle) while the power of the printer 10 is on.

S48 and S50 are respectively similar to S12 and S14 of FIG. 3. In a case of determining that the measured time and date information has been obtained from the time and date management program 26*a* (YES in S50), the log program 30 executes, in S100, the all log sending process (see FIG. 5) to be described later. When S100 is completed, the process of FIG. 4 is terminated.

In a case of determining that the no-change notification has been obtained from the time and date management program 26*a* (NO in S50), the log program 30 selects, in S60, one log information from all log information stored in the log table 36.

In S62, the log program 30 determines whether or not the content of the event indicated by the event information included in the selected log information is included in the priority event list 32. In a case of determining that the content of the event is included in the priority event list 32 (YES in S62), the log program 30 proceeds to S64. In a case of determining that the content of the event is not included in the priority event list 32 (NO in S62), the log program 30 skips S64 and proceeds to S66.

In S64, the log program 30 decides the selected log information as priority log information. The priority log information is log information that is preferentially sent to the log management server 100 even under a situation in which the current time and date information cannot be obtained from the time and date management program 26a. When S64 is completed, the log program 30 proceeds to S66.

In S66, the log program 30 determines whether or not there is log information that has not been selected yet in the log table 36. In a case of determining that there is log information that has not been selected in the log table 36 (YES in S66), the log program 30 returns to S60 and newly selects one log information from the log table 36. On the other hand, in a case of determining that there is no log information that has not been selected in the log table 36 (NO in S66), the log program 30 proceeds to S70.

In a case where one or more log information are decided as the priority log information (S64), the log program 30 converts each of the one or more log information decided as the priority log information to a character string according to the Syslog protocol and sends each of the log information (that is, the priority log information) which have been converted to the character strings to the log management server 100 in S70. By doing so, the priority log information are stored in the log management server 100. In a case where there are plural pieces of log information, the log program 30 may send one file including the plural pieces of log information to the log management server 100, or may send each of the plural pieces of log information in one file to the log management server 100 (that is, a plurality of files may be sent to the log management server 100). Log information that is other than the priority log information among the log information in the log table 36 is not sent to the log management server 100. When the process of S70 is completed, the process of FIG. 4 is terminated.

Figure 5:
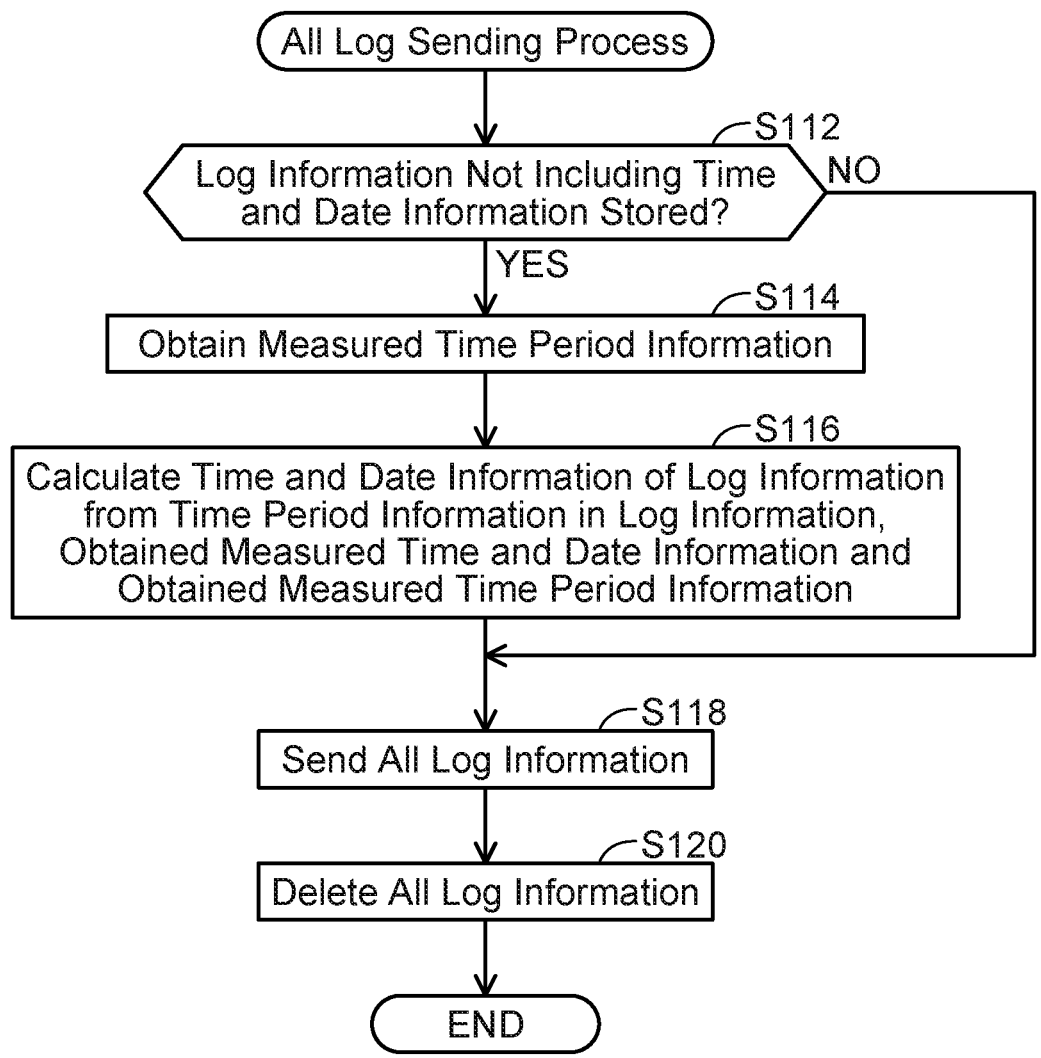
FIG. 5 shows a flowchart of an all log sending process of a first embodiment.

(All Log Sending Process; FIG. 5)

The all log sending process executed in S100 of FIG. 4 will be described with reference to FIG. 5. The all log sending process is executed in a case where the measured time and date information indicating the measured time and date is obtained (YES in S50 of FIG. 4) at the timing when the log information sending process is executed (that is, a timing when the second cycle has elapsed).

In S112, the log program 30 determines whether or not log information that does not include time and date information is stored in the log table 36. In a case of determining that the log information that does not include time and date information is stored in the log table 36 (YES in S112), the log program 30 proceeds to S114. In a case of determining that the log information that does not include time and date information is not stored in the log table 36 (NO in S112), the log program 30 skips S114 and S116 and proceeds to S118.

In S114, the log program 30 supplies a measured time period request to the time period management program 26b and obtains measured time period information from the time period management program 26b. Due to this, the log program 30 can obtain the measured time period information that indicates a lapse of time measured by the time period management program 26b at the timing when the log information sending process is executed.

In S116, the log program 30 firstly specifies one or more log information that do not include time and date information from the log table 36, and selects one log information from the specified one or more log information. Then, the log program 30 calculates a time and date when the event indicated by the selected log information occurred by using the lapse of time indicated by the time period information in the selected log information, the time and date indicated by the measured time and date information obtained in S50 of FIG. 4, and the lapse of time indicated by the measured time period information obtained in S114. Specifically, the log program 30 calculates a time and date when the power of the printer 10 was turned on by subtracting the lapse of time indicated by the measured time period information from the time and date indicated by the measured time and date information. Then, the log program 30 calculates the time and date when the event occurred by adding the lapse of time indicated by the time period information in the selected log information to the calculated time and date when the power of the printer 10 was turned on. Then, the log program 30 stores time and date information indicating the calculated time and date when the event occurred as time and date information of the selected log information in the log table 36.

The log program 30 executes the same process for the other log information included in the specified one or more log information (that is, one or more log information that do not include time and date information). By doing so, each of the specified one or more log information comes to include time and date information indicating the time and date when the event indicated by the log information occurred. Further, the log program 30 deletes one or more time period information included in the specified one or more information. When S116 is completed, the log program 30 proceeds to S118.

In S118, the log program 30 sends all the log information stored in the log table 36 to the log management server 100 in accordance with a Syslog program. Specifically, the log program 30 converts each of all the log information to a character string according to the Syslog protocol and sends each of the log information that have been converted to the character strings to the log management server 100.

In S120, the log program 30 deletes all the log information and all the log numbers in the log table 36. When S120 is completed, the process of FIG. 5 is terminated.

Figure 6:
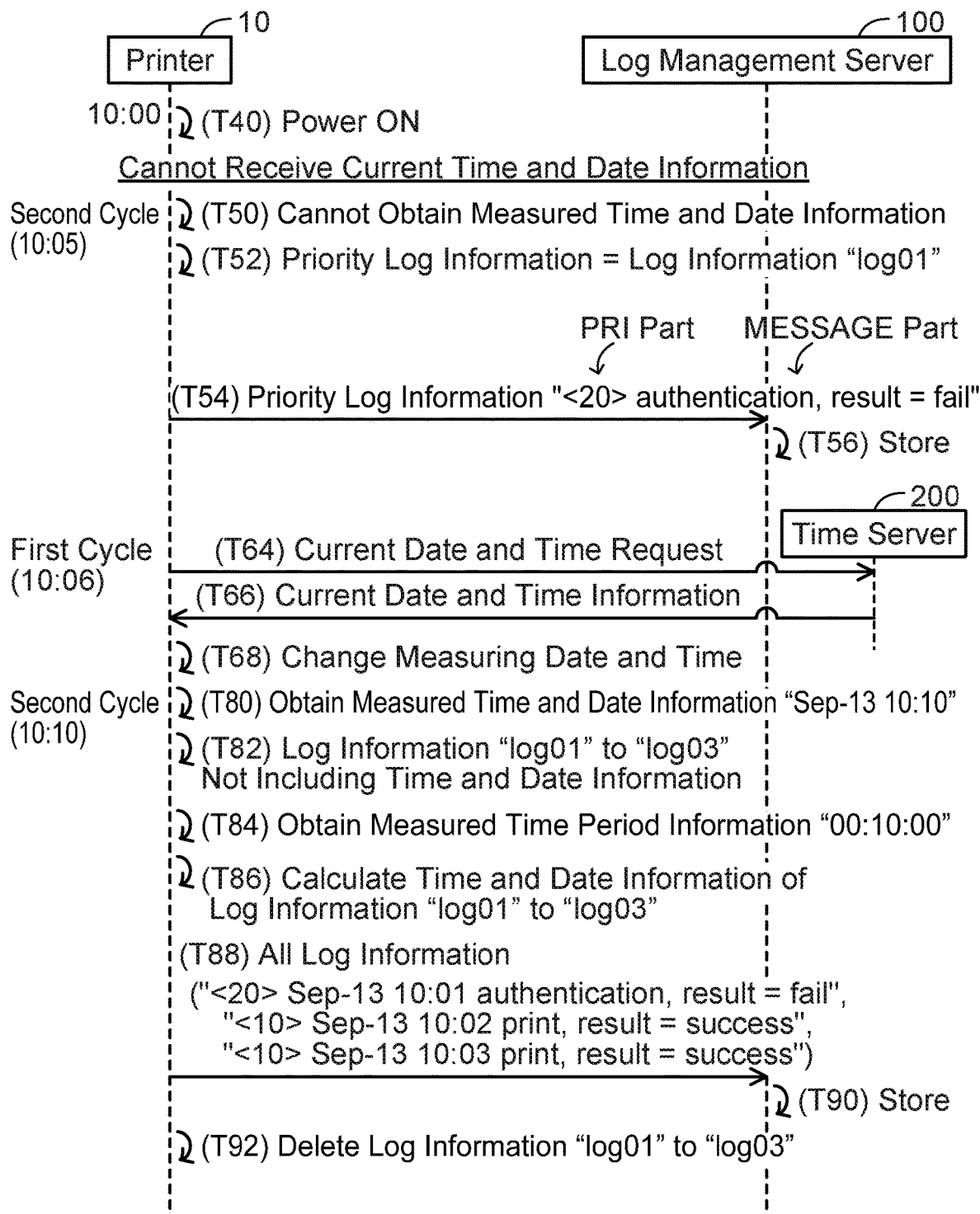
FIG. 6 shows a specific case of the first embodiment.

(Specific Case; FIGS. 6 and 7)

A specific case realized by the processes of FIGS. 2 to 5 will be described with reference to FIGS. 6 and 7. FIG. 6 shows a sequence of processes which the printer 10, the log management server 100, and the time server 200 execute in the present case, and FIG. 7 shows information stored in the log table 36 of the printer 10 and the log management server 100 in the present case.

In the present case, firstly in T40, the power of the printer 10 is turned on at 10:00 of September 13. Due to this, the printer 10 sends a current time and date request to the time server 200 (T14 of FIG. 2). In the present case, an error is occurring in the time server 200, thus the printer 10 cannot receive current time and date information from the time server 200. As a result, at this point of time, the measured time and date is not changed to the current time and date. FIG. 6 omits depiction of characters indicating the date (that is, September 13) in depicting the time and date.

In the present case, the error in the time server 200 is not resolved during a period from when the power of the printer 10 was turned on at 10:00 of September 13 to when the second cycle has elapsed at 10:05 of September 13. Further, three events occur during the period from 10:00 of September 13 to 10:05 of September 13 (see FIG. 7). The three events include an event in which the user authentication is executed at 10:01 of September 13 and the user authentication fails (that is, an event corresponding to a log number "log01"), an event in which the print process is executed at 10:02 of September 13 and the print process succeeds (that is, an event corresponding to a log number "log02"), and an event in which the print process is executed at 10:03 of September 13 and the print process succeeds (that is, an event corresponding to a log number "log03"). As a result, the log table 36 stores three pieces of log information indicating logs of these three events, and each of the three pieces of log information includes no time and date information.

The printer 10 executes the log information sending process (FIG. 4) zat 10:05 of September 13 when the second cycle has elapsed. At this point of time, the measured time and date has not been changed to the current time and date. Due to this, as shown in FIG. 6, the printer 10 cannot obtain the measured time and date information in T50 (NO in S50 of FIG. 4). In a case of selecting the log information corresponding to the log number "log01" from the three pieces of log information (S60), the printer 10 determines that the content of the event indicated by the event information included in the log information corresponding to the log number "log01" is included in the priority event list 32 (YES in S62). Then, the printer 10 decides the log information corresponding to the log number "log01" as the priority log information in T52. Each of the two pieces of log information corresponding to the log numbers "log02" and "log03" is not decided as the priority log information (NO in S62) since the content of the event indicated by the event information included in the log information is not included in the priority event list 32.

In T54, the printer 10 converts the log information corresponding to the log number "log01" decided as the priority log information into a character string according to the Syslog protocol, and sends the priority log information which has been converted into the character string to the log management server 100 (S70 of FIG. 4). The character string according to the Syslog protocol includes a PRI part, a HEADER part, and a MESSAGE part. The PRI part is a value calculated based on a value of Facility indicating a type of system and an order of Priority indicating importance of the event. The HEADER part includes a character string indicating the time and date information. The MESSAGE part includes a character string indicating the event information (such as "authentication, result=fail"). Since the priority log information includes no time and date information, the HEADER part of the priority log information includes no character string indicating time and date information. In T54 of FIG. 6, description of the HEADER part is omitted.

When the log management server 100 receives the priority log information according to the Syslog protocol from the printer 10 in T54, it stores the received priority log information in T56 (see FIG. 7).

Subsequently, in the present case, the error of the time server 200 is resolved during a period from 10:05 of September 13 to 10:06 of September 13 when the first cycle has elapsed. In T64, the printer 10 sends a current time and date request to the time server 200 with the lapse of the first cycle as a trigger, and obtains current time and date information from the time server 200 in T66. Due to this, in T68, the measured time and date is changed to the current time and date indicated by the obtained current time and date information.

Subsequently, in the present case, the printer 10 executes the log information sending process (FIG. 4) at 10:10 of September 13 when the second cycle has elapsed after the measured time and date had been changed to the current time and date. As shown in FIG. 6, the printer 10 obtains measured time and date information "Sep-13 10:10" indicating 10:10 of September 13 in T80 (YES in S50 of FIG. 4). Then, the printer 10 executes the all log sending process (FIG. 5) (S100).

In T82, the printer 10 determines that the three pieces of log information that include no time and date information (that is, the three pieces of log information corresponding to the log numbers "log01" to "log03") are stored in the log table 36 (YES in S112 of FIG. 5).

In T84, the printer 10 obtains measured time period information "00:10:00" that indicates a lapse of time since the power was turned on until 10:10 of September 13 (S114 of FIG. 5).

In T86, the printer 10 calculates time and date information for each of the three pieces of log information corresponding to the log numbers "log01" to "log03" (S116 of FIG. 5). Specifically, the printer 10 subtracts the lapse of time "10 minutes" indicated by the obtained measured time period information from 10:10 of September 13 indicated by the obtained measured time and date information, to calculate the time and date when the power of the printer 10 was turned on, that is, 10:00 of September 13. Then, the printer 10 adds the lapse of time "1 minute" indicated by the time period information in the log information corresponding to the log number "log01" to the calculated time and date 10:00 of September 13, to calculate time and date information "Sep-13 10:01" indicating 10:01 of September 13, which is the time and date when the event indicated by the log information corresponding to the log number "log01" occurred. For the two pieces of log information corresponding to the log numbers "log02" and "log03", the printer 10 similarly calculates two pieces of time and date information "Sep-13 10:02" and "Sep-13 10:03" respectively indicating 10:02 and 10:03 of the same date, which are the times and dates when the events indicated by the respective log information occurred. As a result, as shown in FIG. 7, the three pieces of time and date information "Sep-13 10:01", "Sep-13 10:02", and "Sep-13 10:03" are stored in the log table 36 in association with the log numbers "log01" to "log03", respectively.

As shown in FIG. 6, in T88, the printer 10 sends the three pieces of log information corresponding to the log numbers "log01" to "log03" stored in the log table 36 to the log management server 100 according to the Syslog program (S118 of FIG. 5).

When receiving the three pieces of log information from the printer 10 according to the Syslog protocol in T88, the log management server 100 stores the received three pieces of log information in T90 (see FIG. 7).

Further, when the printer 10 has sent the log information to the log management server 100, the printer 10 deletes the three pieces of log information corresponding to the log numbers "log01" to "log03" and the log numbers "log01" to "log03" in the log table 36 in T92 (S120 of FIG. 6).

Effects of Embodiment

Since the printer 10 cannot be informed of the current time and date before the time and date measured by the time and date management program 26a is changed to the current time and date, it cannot be informed of the time and date when an event (such as failure of the user authentication) occurred, either. According to the case in FIG. 6, the three events, including one event which is failure of the user authentication whose content is included in the priority event list 32 and two events which are success of the print process whose content is not included in the priority event list 32, occurs during the period from when the power of the printer 10 was turned on to 10:05 of September 13. In the present case, the printer 10 sends the priority log information indicating the log of the event of failure in the user authentication (that is, the log information corresponding to the log number "log01") to the log management server 100 (T54 of FIG. 6), despite it not knowing the time and date when this event of the failure in the user authentication occurred (that is, 10:01 of September 13). Although the log management server 100 cannot be informed of the time and date when the event of failure in the user authentication occurred, it can be informed that the event of failure in the user authentication occurred in the printer 10, at 10:05 of the same date before the printer 10 obtains the current time and date information. That is, the log management server 100 can promptly be informed that the event of failure of the user authentication occurred. Further, at 10:10 of the same date after the printer 10 had obtained the current time and date information, the printer 10 calculates the two pieces of time and date information that indicate the times and dates when the two events of success in the print process occurred (T86), and sends the two pieces of log information indicating the logs of these two events (that is, the two pieces of log information corresponding to the log numbers "log02" and "log03") to the log management server 100 (T88). Due to this, the log management server 100 can be informed that the two events of success in the print process occurred as well as the two sets of time and date when these two events occurred (that is, 10:02 and 10:03 of the same date). That is, in a situation where the printer 10 is measuring the time and date that differ from the current time and date, the printer 10 can promptly notify the log management server 100 that an event having a content included in the priority event list 32 (that is, an event which is highly likely caused by an illicit conduct by a third party) occurred in the printer 10. On the other hand, for an event having a content that is not included in the priority event list 32, the printer 10 can notify it to the log management server 100 after knowing the time and date when the event occurred.

Further, in the case where the printer 10 obtains the current time and date information after having sent the priority log information that includes no time and date information to the log management server 100 (T66 of FIG. 6), the printer 10 calculates the time and date information indicating the time and date when the event indicated by the priority log information occurred (T86). Then, the printer 10 sends the log information corresponding to the log number "log01" including the calculated time and date information (that is, the log information indicating the same log as the log of the priority log information) to the log management server 100 (T88). Due to this, the log management server 100 can be informed of the time and date when the event indicated by the priority log information occurred after the priority log information had been sent to the log management server 100.

(Corresponding Relationships)

The printer 10, the memory 24, and the log management server 100 are respectively examples of "communication device", "memory", and "server". The time and date management program 26a and the time period management program 26b are respectively examples of "time and date measuring unit" and "time period measuring unit". The event including the content included in the priority event list 32 is an example of "predetermined event". The priority log information in T54 of FIG. 6 is an example of "specific log information". "boot=00:02:00" in the log information corresponding to the log number "log02" of FIG. 7 is an example of "first time period information". 10:10 of September 13 when the second cycle has elapsed in FIG. 6 is an example of "first (or second) timing". The log information corresponding to the log number "log02" in T88 of FIG. 6 is an example of "first log information". The time and date information "Sep-13 10:02" of the log information corresponding to the log number "log02" in FIG. 7 is an example of "first time and date information". "boot=00:01:00" in the log information corresponding to the log number "log01" of FIG. 7 is an example of "second time period information". The log information corresponding to the log number "log01" in T88 of FIG. 6 is an example of "second log information".

T54 of FIG. 6, S20 of FIGS. 3, T86 and T88 of FIG. 6 are respectively examples of "send specific log information to a server", "store first time period information", "calculate first time and date information", and "send first log information to the server".

Second Embodiment

In the first embodiment, the printer calculates the time and date of the priority log information after having sent the priority log information, and sends the log information including the time and date when the event indicated by the priority log information occurred. Instead of this, in a second embodiment, the printer 10 sends reference information for calculating the time and date to an external device (such as the terminal device 300) after having sent the priority log information.

In this embodiment, the memory 24 may further store a time period ID. The time period ID is unique information for identifying a lapse of time measured by the time period management program 26b. The time period ID is generated each time the power of the printer 10 is turned on.

Further, the memory 24 further stores a sending flag. The sending flag indicates a value, which is one of "ON" indicating that priority log information has been sent and "OFF" indicating that priority log information has not been sent yet. A default value of the sending flag is "OFF".

(Log Information Storing Process; FIG. 3)

A log information storing process of the present embodiment is similar to that of the first embodiment, except that the content of the process of S20 is different. In S20, the log program 30 stores log information including the obtained measured time period information (such as the character string "boot=00:01:00") and the time period ID (such as a character string "a01") in the log table 36.

(Log Information Sending Process; FIG. 4)

A log information sending process of the present embodiment is similar to that of the first embodiment, except that processes of S72 and S74 are executed after S70 and the content of the all log sending process in S100 is different. When the log program 30 sends the priority log information to the log management server 100 in S70, it changes the sending flag from "OFF" to "ON" in S72.

In S74, the log program 30 deletes the one or more log information decided as the priority log information and their corresponding log numbers in the log table 36. When S74 is completed, the process of FIG. 4 is terminated.

Figure 8:
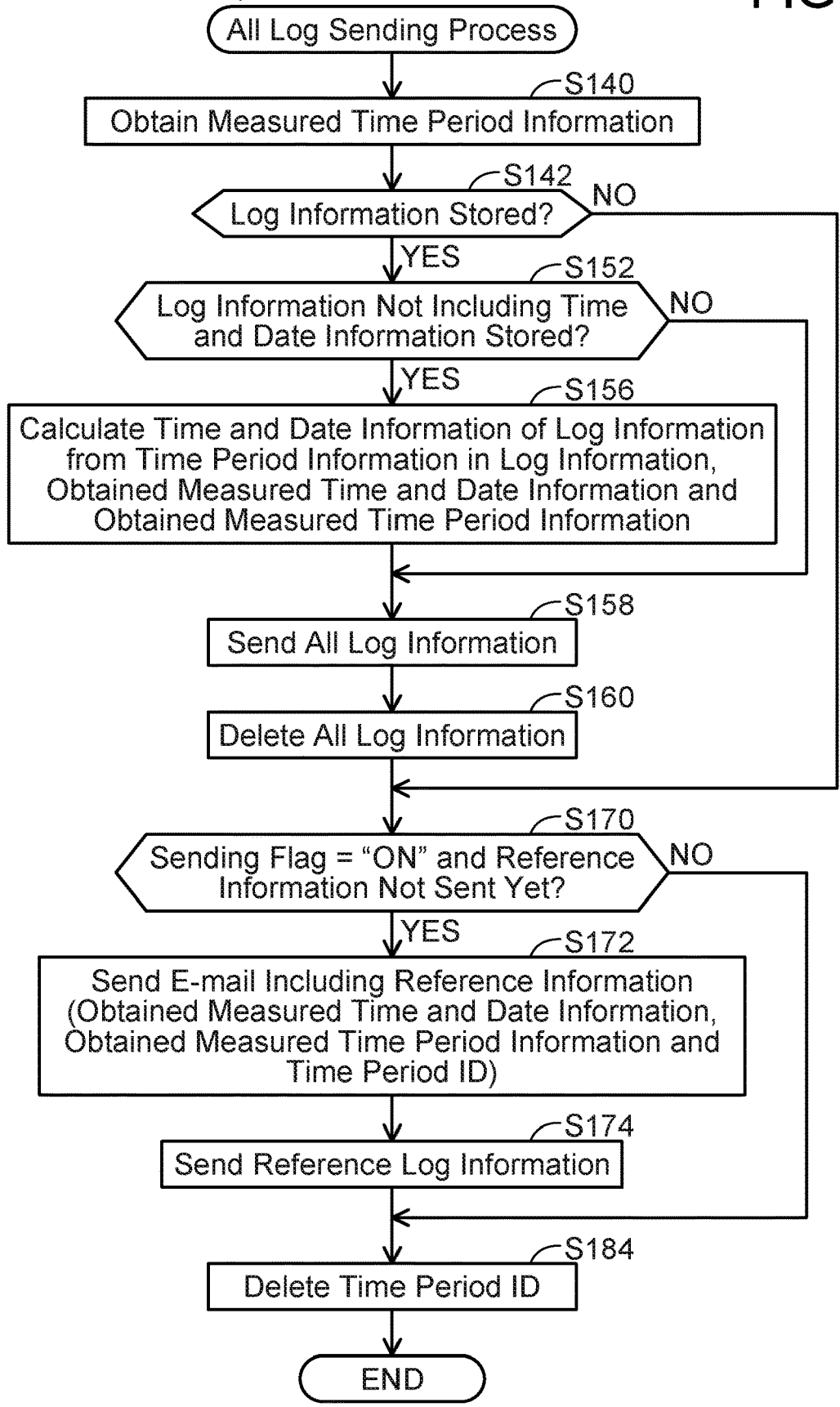
FIG. 8 shows a flowchart of an all log sending process of a second embodiment.

(All Log Sending Process; FIG. 8)

The contents of an all log sending process of the present embodiment will be described with reference to FIG. 8. S140 is similar to S114 of FIG. 5. In S142, the log program 30 determines whether or not any log information is stored in the log table 36. In a case of determining that log information is stored in the log table 36 (YES in S142), the log program 30 proceeds to S152. On the other hand, in a case of determining that there is no log information stored in the log table 36, the log program 30 skips processes of S152 to S160 and proceeds to S170.

S152 to S160 are similar to S112 to S120 of FIG. 5. When having sent all the log information in the log table 36 and deleted the same (S158, S160), the log program 30 proceeds to S170.

In S170, the log program 30 determines whether or not a predetermined condition that the sending flag indicates "ON" and the reference information (to be described later) has not yet been sent is satisfied. When the predetermined condition is satisfied (YES in S170), the log program 30 proceeds to S172, whereas when the predetermined condition is not satisfied (NO in S170), the log program 30 skips processes of S172, S174 and proceeds to S184.

In S172, the log program 30 sends an electronic mail that includes a main body describing the reference information, with the e-mail address MA in the memory 24 as its destination. The reference information is information for calculating the time and date information indicating the time and date when the event indicated by the priority log information sent to the log management server 100 occurred. The reference information includes the measured time and date information obtained in S50 of FIG. 4, the measured time period information obtained in S140, and the time period ID. When the electronic mail is sent, the administrator can see the reference information described in the main body of the electronic mail, for example, by operating the terminal device 300. Due to this, the administrator accesses the log management server 100 by operating the terminal device 300, and identifies the priority log information that includes the time period ID in the electronic mail. Then, the administrator can calculate the time and date information indicating the time and date when the event indicated by the identified priority log information occurred by using the time period information in the identified priority log information and the respective information in the electronic mail (that is, the measured time and date information, and the measured time period information). That is, the time period ID is information for identifying the priority log information. A method of calculating the time and date information is similar to the method described for S116 of FIG. 5.

In S174, the log program 30 converts the reference information to a character string according to the Syslog protocol, and sends the reference information that has been converted to the character string (hereinbelow may be termed "reference log information") to the log management server 100. Due to this, the reference information can be managed in the log management server 100 similarly to the log information. Further, for example, the log management server 100 that had received the reference log information specifies priority log information that includes the time period ID in the reference log information from among the plurality of priority log information stored in the log management server 100. Then, the log management server 100 can calculate the time and date information indicating the time and date when the event indicated by the specified priority log information occurred by using the time period information in the specified priority log information and the respective information in the reference log information (that is, the measured time and date information, and the measured time period information). A method of calculating the time and date information is similar to the method described for S116 of FIG. 5.

In S184, the log program 30 deletes the time period ID in the memory 24. When S184 is completed, the process of FIG. 8 is terminated.

For example, in a particular case where it is determined that no log information is stored in the log table 36 and the sending flag indicates "OFF" (NO in S142 and NO in S170), the process of S184 is executed. The particular case means that no priority log information has been sent to the log management server 100 since no event occurs in the period from when the power of the printer 10 was turned on to when the time and date measured by the time and date management program 26a is changed to the current time and date. In the particular case, the time period ID is not necessary. According to this configuration, a storage capacity of the memory 24 is suppressed from being reduced by unnecessary time period ID.

Figure 9:
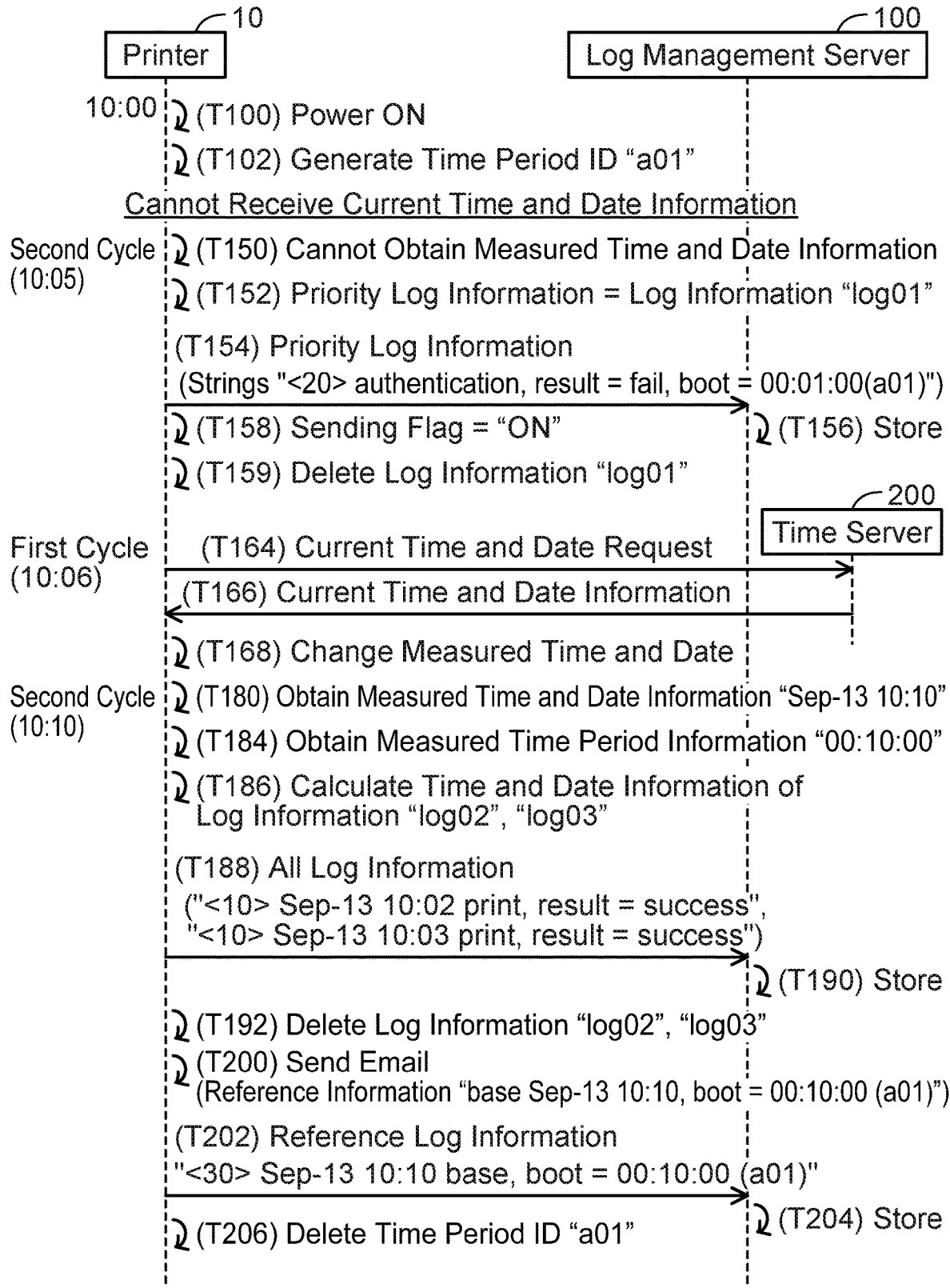
FIG. 9 shows a specific case B1 of the second embodiment.

(Specific Case B1; FIGS. 9 and 10)

A specific case B1 realized by the processes of FIGS. 2 to 4 and 8 will be described with reference to FIGS. 9 and 10. FIG. 9 shows a sequence of processes which the printer 10, the log management server 100, and the time server 200 execute in the present case, and FIG. 10 shows information stored in the log table 36 of the printer 10 and the log management server 100 in the present case.

T100 is similar to T40 of FIG. 6. In the present case, the printer 10 generates a time period ID "a01" in T102 and stores the time period ID "a01" in the memory 24. In the present case as well, similar to the case of FIG. 6, an error is occurring in the time server 200. Due to this, at this point of time, the measured time and date is not changed to the current time and date.

In the present case as well, the error in the timer server 200 is not resolved and further three events that are the same as those in the case of FIG. 6 occur during the period from when the power of the printer 10 was turned on at 10:00 of September 13 to when the second cycle has elapsed at 10:05 of September 13. In the present case, each of three pieces of log information that indicate the logs of the three events (that is, the three pieces of log information corresponding to the log numbers "log01" to "log03") includes the time period ID "a01" (see FIG. 10).

T150 to T152 are similar to T50 and T52 of FIG. 6. T154 is similar to T54 of FIG. 6, except that the priority log information includes the time period ID "a01". T156 is similar to T56 of FIG. 6.

When having sent the priority log information to the log management server 100 in T154, the printer 10 changes the sending flag from "OFF" to "ON" in T158 (S72 of FIG. 4).

In T159, the printer 10 deletes the log information corresponding to the log number "log01" decided as the priority log information in the log table 36 (S74 of FIG. 4). As a result, the two pieces of log information corresponding to the log numbers "log02", "log03" remain in the log table 36 (see FIG. 10).

T164 to T168 of FIG. 9 are similar to T64 to T68 of FIG. 6. In T180, the printer 10 obtains the measured time and date information "Sep-13 10:10" indicating 10:10 of September 13 (YES in S50 of FIG. 4), similarly to T80 of FIG. 6. Then, the printer 10 executes the all log sending process (FIG. 8) (S100).

In T184, the printer 10 obtains the measured time period information "00:10:00" indicating the lapse of time from when the power was turned on until 10:10 of September 13 (S140 of FIG. 8).

In T186, the printer 10 determines that the two pieces of log information corresponding to the log numbers "log02", "log03" are stored in the log table 36 (YES in S142 of FIG. 8) as well as determines that each of the two pieces of log information includes no time and date information (YES in S152). Then, the printer 10 calculates time and date information for each of the two pieces of log information corresponding to the log numbers "log02", "log03" (S156).

A method of calculating the time and date information is similar to the method described for T86 of FIG. 6.

In T188, the printer 10 sends the two pieces of log information corresponding to the log numbers "log02", "log03" to the log management server 100 (S158 of FIG. 8). T190 is similar to T90 of FIG. 6, except that the two pieces of log information corresponding to the log numbers "log02", "log03" are stored in the log management server 100. In T192, the printer 10 deletes the two pieces of log information corresponding to the log numbers "log02", "log03" and the log numbers "log02", "log03" in the log table 36 (S160 of FIG. 8).

In T200, the printer 10 determines that the sending flag indicates "ON" and the reference information has not been sent yet (YES in S170 of FIG. 8), and sends an electronic mail including a main body describing the reference information "base Sep-13 10:00 boot=00:10:00(a01)" (S172 of FIG. 8). Subsequently, in T202, the printer 10 sends, to the log management server 100, reference log information in which the reference information "base Sep-13 10:00 boot=00:10:00(a01)" has been converted to a character string according to the Syslog protocol (S174).

When receiving the reference log information from the printer 10, the log management server 100 stores the reference log information in T204.

Further, in T206, the printer 10 deletes the time period ID "a01" in the memory 24 (S184 of FIG. 8).

According to the present case, the printer 10 can promptly notify the content of the event that includes the content included in the priority event list 32 before obtaining the current time and date information, as well as can notify events other than the aforementioned event after obtaining the current time and date information, along with the times and dates when these events occurred. In the present case as well, the effects similar to those of the first embodiment can be achieved. Further, in the present case, as described above, the time and date when the event indicated by the priority log information occurred can be calculated by the electronic mail including the reference information and the sending of the reference log information (T200, T202 of FIG. 9).

Figure 11:
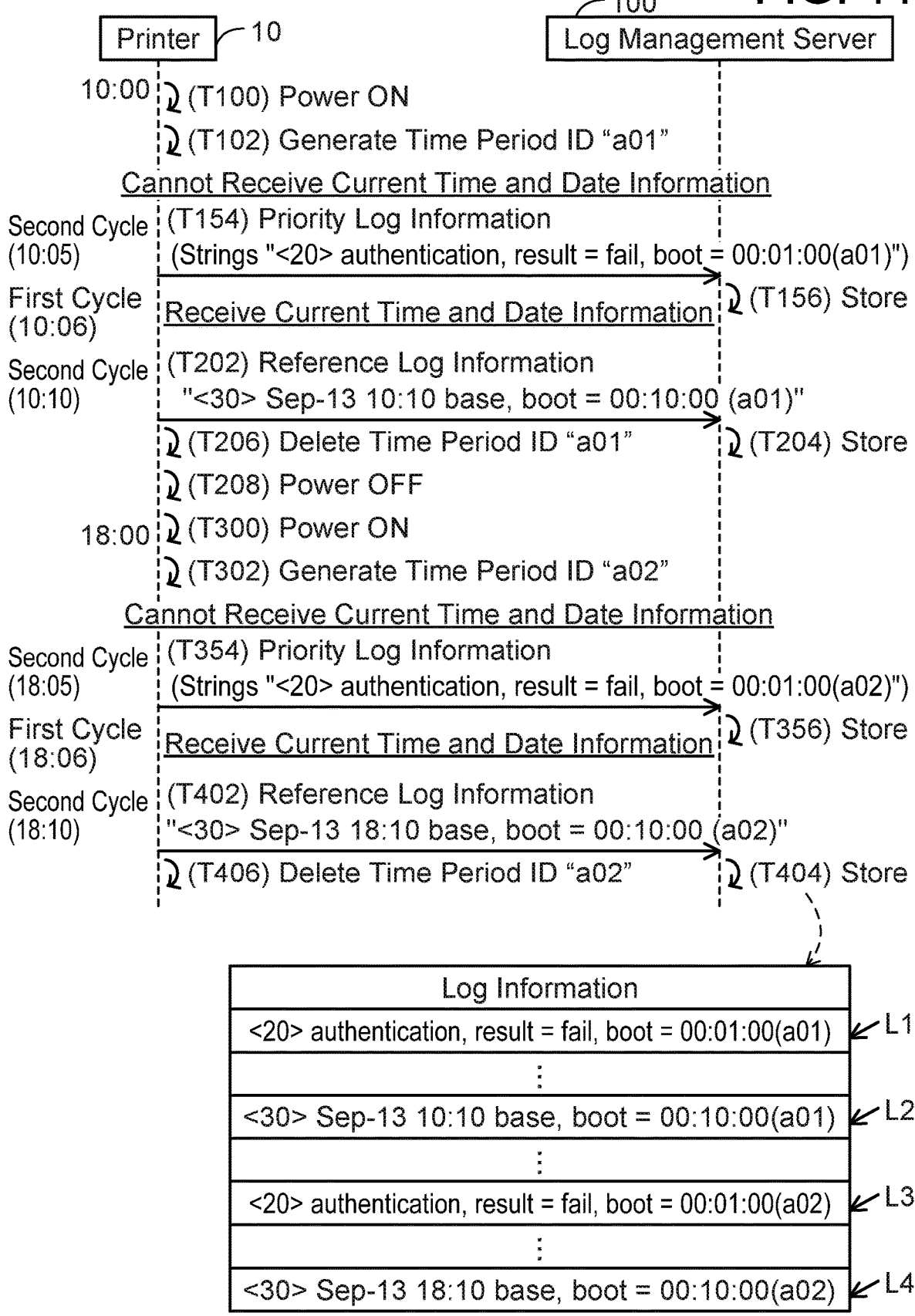
FIG. 11 shows a specific case B2 of the second embodiment.

(Specific Case B2; FIG. 11)

A specific case B2 realized by the processes of FIGS. 2 to 4 and 8 will be described with reference to FIG. 11. In the present case as well, the processes of T100 to T206 are executed, similarly to Case B1 of FIG. 9. Further, in the present case, the power of the printer 10 is turned off in T208 after the time period ID "a01" is deleted.

Next, in the present case, the power of the printer 10 is turned on at 18:00 of September 13 in T300. Then, the printer 10 generates a time period ID "a02" in T302. At this point of time, an error is occurring in the time server 200 and thus the current time and date information cannot be received from the time server 200.

In the present case, the error in the timer server 200 is not resolved during a period from when the power of the printer 10 was turned on at 18:00 of September 13 to when the second cycle has elapsed at 18:05 of September 13. Further, plural events, which include an event of failure in the user authentication, occur during the period from 18:00 of September 13 to 18:05 of September 13. As a result, similar to T154, the printer 10 sends the priority log information indicating the log of the event of failure in the user authentication to the log management server 100 in T354 (S70 of FIG. 5). T356 is similar to T156, except that the time period ID in the priority log information is "a02".

Then, in the present case, the error in the time server 200 is resolved during a period from 18:05 of September 13 to 18:06 of September 13 when the first cycle has elapsed. As a result, the current time and date information is received from the time server 200.

Then, in the present case, the log information sending process (FIG. 4) is executed at 18:10 of September 13 when the second cycle has elapsed after the measured time and date had been changed to the current time and date. As a result, the printer 10 sends the reference log information including the time period ID "a02" to the log management server 100 in T402 (S174 of FIG. 8). T404 is similar to T204, except that the time period ID in the reference log information is "a02". T406 is similar to T206, except that the time period ID "a02" is deleted.

As shown in FIG. 11, the log management server 100 stores plural pieces of log information which include priority log information L1 including the time period ID "a01", reference log information L2 including the time period ID "a01", priority log information L3 including the time period ID "a02", and reference log information L4 including the time period ID "a02". For example, the log management server 100 specifies the priority log information L1 including the time period ID "a01" that is included in the reference log information L2 from among the plural pieces of log information. Then, the log management server 100 can calculate the time and date information indicating the time and date when the event indicated by the priority log information L1 occurred by using the time period information in the specified priority log information L1 and the respective information in the reference log information L2 (that is, the measured time and date information, and the measured time period information). Similarly, the log management server 100 can specify the priority log information L3 by using the time period ID "a02" that is included in the reference log information L4, and calculate the time and date information indicating the time and date when the event indicated by the priority log information L3 occurred. According to the present case, combination of the reference log information and the priority log information can be specified even though the operation to turn on the power of the printer 10 is executed plural times. As a result, the time and date information indicating the time and date when the event indicated by the priority log information occurred can suitably be calculated.

(Corresponding Relationships) "boot=00:01:00" in the log information corresponding to the log number "log01" in FIG. 10 is an example of "first time period information". 10:10 of September 13 when the second cycle has elapsed in FIG. 9 is an example of "third timing". The reference information in T200 of FIG. 9 is an example of "reference information". The terminal device 300 or the log management server 100 are examples of "external device". The time period ID is an example of "log identification information (or time period identification information)". The time period ID "a01" is an example of "specific time period identification information".

T154 of FIG. 9, S20 of FIGS. 3, T186 and T188 of FIG. 9 are respectively examples of "send specific log information to a server", "store first time period information", "calculate first time and date information", and "send first log information to the server".

REFERENCE EXAMPLE

A reference example in which the second embodiment is modified will be described. In the second embodiment, the process of S62 is executed in the log information sending process of FIG. 4. Instead of this, the log program 30 may send all the log information in the log table 36 to the log management server 100 without executing the determination of S62, in the case of determining that the no-change notification has been obtained from the time and date management program 26a (NO in S50). In this case, in the case of FIG. 9, the process of T152 may not be executed and three pieces of log information that include no time and date information may be sent to the log management server 100 in T154. Then, in T200, an electronic mail including the reference information may be sent. Due to this, even in the case where events occur before the measured time and date is changed to the current time and date, the contents of these events can promptly be notified to the log management server 100, and the times and dates when the respective events of the three pieces of log information occurred can be calculated by using the reference information in the electronic mail after the measured time and date is changed to the current time and date.

Features of this reference example will be listed below. A communication device may comprise: a time and date measuring unit configured to measure a time and date, wherein in a case where current time and date information indicating a current time and date is obtained, the time and date measured by the time and date measuring unit is changed to the current time and date indicated by the obtained current time and date information; a time period measuring unit configured to measure a lapse of time from when a power of the communication device is turned on; a processor; and a storage storing computer-readable instructions therein, wherein the computer-readable instructions, when executed by the processor, cause the communication device to: in a case where a particular event occurs in the communication device before the time and date measured by the time and date measuring unit is changed to the current time and date, send first log information to a server, the first log information indicating a log of the particular event and including the lapse of time measured by the time period measuring unit at a first timing when the particular event occurs; and in a case where the time and date measured by the time and date measuring unit is changed to the current time and date after the first log information has been sent to the server, send reference information to an external device at a second timing that is after the time and date measured by the time and date measuring unit is changed to the current time, the reference information being for calculating time and date information indicating a time and date when the particular event occurred and including the time and date measured by the time and date measuring unit at the second timing and a lapse of time measured by the time period measuring unit at the second timing.

(Variant 1) The "communication device" may not be the printer 10, and may, for example, be another device such as a scanner, a multi-function device, a portable terminal, a PC, and a server.

(Variant 2) The time and date management program 26a and the time period management program 26b may not be included in the OS program 26. For example, the time and date management program 26a and the time period management program 26b may be included in the log program 30. Generally speaking, a computer program may cause a computer of a communication device to function as a time and date measuring unit and a time period measuring unit.

(Variant 3) In the above embodiments, in the printer 10, the CPU 22 measures the time and date according to the time and date management program 26a. Instead of this, the printer 10 may be provided with a clock that is a separate element from the CPU 22. Further, in the above embodiments, in the printer 10, the CPU 22 measures the lapse of time according to the time period management program 26b. Instead of this, the printer 10 may be provided with a counter that is a separate element from the CPU 22. In this variant, the separate clock and the separate counter are respectively examples of "time and date measuring unit" and "time period measuring unit".

(Variant 4) In the above embodiments, the printer 10 receives the current time and date information from the time server 200 (T16 of FIG. 2). Instead of this, the current time and date information may be inputted to the printer 10 by the user by an operation unit of the printer 10 being operated by the user. In this variant, the input of the current time and date information by the user to the printer 10 is an example of "in a case where current time and date information indicating a current time and date is obtained".

(Variant 5) In the above embodiments, the log information is stored in the memory 24 of the printer 10. Instead of this, the log information may be stored in a memory that is a separate element from the printer 10. In this variant, the separate memory is an example of "memory".

(Variant 6) In the first embodiment above, after having sent the priority log information, the printer 10 sends the log information that indicates the same log as the priority log information and includes the time and date information to the log management server 100 (T88 of FIG. 6). Instead of this, the printer 10 may not send the log information indicating the same log as the priority log information to the log management server 100 in T88. In this variant, "store second time period information", "calculate second time and date information", and "send second log information to the server" may be omitted.

(Variant 7) The "external device" may not be the log management server 100, and may, for example, be another server other than the log management server 100. In this case, for example, the log management server 100 may receive the reference information from the other server after the reference information has been sent to the other server. Then, the log management server 100 may calculate the time and date information indicating the time and date when the event indicated by the priority log information occurred by using the received reference information and the time period information included in the priority log information in the log management server 100.

(Variant 8) In the second embodiment above, one of S172 and S174 in FIG. 8 may be omitted. Further, in the second embodiment above, S172 and S174 in FIG. 8 may be omitted. In this variant, "send reference information" may be omitted.

(Variant 9) In the second embodiment above, the printer 10 generates the time period ID (T102 of FIG. 9). Instead of this, the printer 10 may store a list of a plural time period IDs in the memory 24 in advance. Further, the printer 10 may select one time period ID from the list each time the power of the printer 10 is turned on, and may store the selected time period ID in a predetermined area of the memory 24. In this variant, "time period identification information" may not be generated.

(Variant 10) In the second embodiment above, the printer 10 sends the priority log information including the time period ID "a01" to the log management server 100 (T154 of FIG. 9), and sends the reference log information including the time period ID "a01" to the log management server 100 (T202). Instead of this, the printer 10 may generate an ID for identifying the priority log information when the priority log information is to be sent, and may send the priority log information including the generated ID to the log management server 100. Then, the printer 10 may send the reference log information including the generated ID to the log management server 100. In this variant, the aforementioned ID is an example of "log identification information".

(Variant 11) In the second embodiment above, the priority log information and the reference log information may not include a time period ID. In this variant, the "communication device" may not use "log identification information (or time period identification information)".

(Variant 12) The process of S184 in FIG. 8 may not be executed. In this variant, "delete the time period identification information" may be omitted.

(Variant 13) In the above embodiments, the priority event list 32 includes failure of the user authentication as its content. Instead of this, the priority event list 32 may include success of the user authentication and failure of the user authentication as its contents. Further, in this variant, the priority event list 32 may not include the content of success or failure of the print process. As described above, the user authentication is executed when the setting information of the printer 10 is to be changed. Due to this, the user authentication is a process that is executed when the change request is received from the external device of the unauthorized third party. The priority event list 32 of this variant includes contents of events that could occur when such an illicit conduct by the third party is executed. In this variant, "predetermined event" may include execution of the authentication process, and "event different from the predetermined even" may not include execution of the authentication process.

(Variant 14) In the above embodiments, the log information is converted to the character string according to the Syslog protocol and the log information that has been converted to the character string is sent to the log management server 100 (T88 of FIG. 6). Instead of this, the log information may be sent to the log management server 100 without being converted to the character string according to the Syslog protocol. Further, the log information may be sent to the log management server 100 according to a predetermined protocol other than the Syslog protocol (such as a protocol designed by the vendor of the printer 10). Generally speaking, "specific log information and first log information" may not be accorded to the predetermined protocol, and may be accorded to a protocol other than the Syslog protocol.

(Variant 15) In the above embodiments, the processes of FIGS. 2 to 11 are implemented by the CPU 22 of the printer 10 executing the programs 26, 30 (that is, software). Instead of this, one or more of the processes may be implemented by hardware such as a logic circuit.

What is claimed is:

1. A communication device comprising:
   a time and date measuring unit configured to measure a time and date, wherein in a case where current time and date information indicating a current time and date is obtained, a time and date measured by the time and date measuring unit is changed to the current time and date indicated by the obtained current time and date information;
   a time period measuring unit configured to measure a lapse of time from when a power of the communication device is turned on;
   a processor; and
   a storage storing computer-readable instructions therein, wherein the computer-readable instructions, when executed by the processor, cause the communication device to:
   in a first case where a first event occurs in the communication device before the time and date measured by the time and date measuring unit is changed to the current time and date and the first event is a predetermined event, send specific log information to a server, the specific log information indicating a log of the first event which is the predetermined event, wherein in a second case where the first event is an event different from the predetermined event, the specific log information is not sent to the server;
   in the second case, store first time period information in a memory, the first time period information indicating a lapse of time measured by the time period measuring unit at a timing when the first event occurs;
   in the second case, calculate first time and date information at a first timing that is after the time and date measured by the time and date measuring unit has been changed to the current time and date, the first time and date information indicating a time and date when the first event, which is the event different from the predetermined event, occurred, and the first time and date information being calculated by using the lapse of time indicated by the first time period information in the memory, a time and date measured at the first timing by the time and date measuring unit, and a lapse of time measured at the first timing by the time period measuring unit; and
   in a case where the first time and date information is calculated, send first log information to the server, the first log information indicating a log of the first event which is the event different from the predetermined event and including the calculated first time and date information.

2. The communication device as in claim 1, wherein the computer-readable instructions, when executed by the processor, further cause the communication device to:
   in the first case, store second time period information in the memory, the second time period information indicating the lapse of time measured by the time period measuring unit at the timing when the first event occurs;
   in a case where the time and date measured by the time and date measuring unit is changed to the current time and date after the specific log information has been sent to the server, calculate second time and date information at a second timing that is after the time and date measured by the time and date measuring unit has been changed to the current time and date, the second time and date information indicating a time and date when the first event, which is the predetermined event, occurred, and the second time and date information being calculated by using the lapse of time indicated by the second time period information in the memory, a time and date measured at the second timing by the time and date measuring unit, and a lapse of time measured at the second timing by the time period measuring unit; and
   in a case where the second time and date information is calculated, send second log information to the server, the second log information indicating a log of the first event which is the predetermined event and including the calculated second time and date information.

3. The communication device as in claim 1, wherein the specific log information further includes third time period information indicating the lapse of time measured by the time period measuring unit at the timing when the first event occurs, and the computer-readable instructions, when executed by the processor, further cause the communication device to:
in a case where the time and date measured by the time and date measuring unit is changed to the current time and date after the specific log information has been sent to the server, send reference information to an external device at a third timing that is after the time and date measured by the time and date measuring unit has been changed to the current time and date, the reference information being for calculating time and date information indicating a time and date when the first event occurred, and the reference information including a time and date measured at the third timing by the time and date measuring unit and a lapse of time measured at the third timing by the time period measuring unit.

4. The communication device as in claim 3, wherein the specific log information further includes log identification information identifying the specific log information, and
the reference information further includes the log identification information.

5. The communication device as in claim 4, wherein the lapse of time measured by the time period measuring unit is reset to zero every time the power of the communication device is turned on,
the computer-readable instructions, when executed by the processor, further cause the communication device to:
store time period identification information in the memory every time the power of the communication device is turned on, the time period identification information identifying a lapse of time measured by the time period measuring unit; and
in a case where the first event occurs during a time period from when specific time period identification information was stored in the memory due to the power of the communication device being turned on until when the power of the communication device is turned off, the log identification information includes the specific time period identification information.

6. The communication device as in claim 5, wherein the computer-readable instructions, when executed by the processor, further cause the communication device to:
in a case where no event occurs in the communication device during a time period from when the time period identification information was stored in the memory until when the time and date measured by the time and date measuring unit is changed to the current time and date, delete the time period identification information from the memory.

7. The communication device as in claim 3, wherein an electronic mail including the reference information is sent to the external device.

8. The communication device as in claim 3, wherein the specific log information is sent to the server according to a Syslog protocol,
the first log information is sent to the server according to the Syslog protocol, and
the reference information is sent to the external device, which is the server, according to the Syslog protocol.

9. The communication device as in claim 1, wherein the first event includes that an authentication process for authenticating a user of the communication device is executed,
the predetermined event includes that the authentication process fails, and the event different from the predetermined event includes that the authentication process succeeds.

10. The communication device as in claim 1, wherein the predetermined event includes that an authentication process for authenticating a user of the communication device is executed, and
the event different from the predetermined event does not include that the authentication process is executed.

11. The communication device as in claim 1, wherein the specific log information and the first log information are sent to the server according to a Syslog protocol.

12. A non-transitory computer-readable medium storing computer-readable instructions for a communication device, wherein the communication device comprises:
a time and date measuring unit configured to measure a time and date, wherein in a case where current time and date information indicating a current time and date is obtained, the time and date measured by the time and date measuring unit is changed to the current time and date indicated by the obtained current time and date information; and
a time period measuring unit configured to measure a lapse of time from when a power of the communication device is turned on,
wherein the computer-readable instructions, when executed by a processor of the communication device, cause the communication device to:
in a first case where a first event occurs in the communication device before the time and date measured by the time and date measuring unit is changed to the current time and date and the first event is a predetermined event, send specific log information to a server, the specific log information indicating a log of the first event which is the predetermined event, wherein in a second case where the first event is an event different from the predetermined event, the specific log information is not sent to the server;
in the second case, store first time period information in a memory, the first time period information indicating a lapse of time measured by the time period measuring unit at a timing when the first event occurs;
in the second case, calculate first time and date information at a first timing that is after the time and date measured by the time and date measuring unit has been changed to the current time and date, the first time and date information indicating a time and date when the first event, which is the event different from the predetermined event, occurred, and the first time and date information being calculated by using the lapse of time indicated by the first time period information in the memory, a time and date measured at the first timing by the time and date measuring unit, and a lapse of time measured at the first timing by the time period measuring unit; and
in a case where the first time and date information is calculated, send first log information to the server, the first log information indicating a log of the first event which is the event different from the predetermined event and including the calculated first time and date information.

* * * * *